United States Patent
Imazu et al.

(10) Patent No.: US 7,389,168 B2
(45) Date of Patent: Jun. 17, 2008

(54) SPEED RATIO CONTROL APPARATUS AND METHOD FOR A HYBRID TRANSMISSION

(75) Inventors: Tomoya Imazu, Yokohama (JP); Toshikazu Oshidari, Kanagawa (JP); Shinichiro Joe, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 769 days.

(21) Appl. No.: 10/980,327

(22) Filed: Nov. 4, 2004

(65) Prior Publication Data
US 2005/0107207 A1 May 19, 2005

(30) Foreign Application Priority Data
Nov. 18, 2003 (JP) .............................. 2003-388364

(51) Int. Cl.
*B60L 11/14* (2006.01)
*F16H 61/04* (2006.01)
*G06F 19/00* (2006.01)

(52) U.S. Cl. .......................... 701/54; 701/22; 701/67; 701/81; 475/5

(58) Field of Classification Search ................ 701/51, 701/54, 22, 67, 70, 75, 79, 81, 84, 90; 475/5, 475/35
See application file for complete search history.

(56) References Cited

U.S. PATENT DOCUMENTS

| 5,951,614 A * | 9/1999 | Tabata et al. ................. 701/54 |
| 6,019,699 A * | 2/2000 | Hoshiya et al. ............... 477/20 |
| 2002/0117339 A1 | 8/2002 | Nakashima |
| 2003/0073534 A1 | 4/2003 | Oshidari et al. |
| 2004/0198551 A1 | 10/2004 | Joe et al. |
| 2005/0080535 A1* | 4/2005 | Steinmetz et al. ............ 701/51 |

FOREIGN PATENT DOCUMENTS

| EP | 0 943 475 A2 | 9/1999 |
| EP | 1 149 725 A2 | 10/2001 |
| EP | 1 346 865 A1 | 9/2003 |
| JP | 2003-34154 A | 2/2003 |

OTHER PUBLICATIONS

U.S. Appl. No. 10/895,370, filed Jul. 21, 2004, Imazu et al.
U.S. Appl. No. 10/982,883, filed Nov. 8, 2004, Joe.
U.S. Appl. No. 10/986,197, filed Nov. 12, 2004, Joe et al.

* cited by examiner

*Primary Examiner*—Tan Q Nguyen
(74) *Attorney, Agent, or Firm*—Foley & Lardner LLP

(57) ABSTRACT

In speed ratio control apparatus and method for a hybrid transmission, an integrated controller calculates a speed ratio manipulated variable in accordance with a deviation between a speed ratio representative command value and a speed ratio representative actually measured value. Then the controller calculates a speed ratio purpose component command value for each drivingly input element torque which is drivingly inputted to a differential mechanism of the hybrid transmission according to the calculated speed ratio manipulated variable, an acceleration ratio of each drivingly input element in a shift motion, and an inertia of each drivingly input element in the shift motion. Then, the controller outputs each calculated speed ratio purpose component command value to a torque actuator of the corresponding drivingly input element.

13 Claims, 10 Drawing Sheets

FIG.2

|  | LOW | LOW-iVT | 2ND | HIGH-iVT | HIGH |
|---|---|---|---|---|---|
| LOW-BRAKE | ON | ON | ON | OFF | OFF |
| HIGH-CLUTCH | OFF | OFF | ON | ON | ON |
| HIGH-LOW-BRAKE | ON | OFF | OFF | OFF | ON |

FIG.3

| | | BINARY(0:OFF, 1:ON) | | | | | |
|---|---|---|---|---|---|---|---|
| | | E | EC | M | LB | HC | HLB |
| EV | LOW | 0 | 0 | 1 | 1 | 0 | 1 |
| | LOW-iVT | 0 | 0 | 1 | 1 | 0 | 0 |
| | 2ND | 0 | 0 | 1 | 1 | 1 | 0 |
| | HIGH-iVT | 0 | 0 | 1 | 0 | 1 | 0 |
| | HIGH | 0 | 0 | 1 | 0 | 1 | 1 |
| HEV | LOW | 1 | 1 | 1 | 1 | 0 | 1 |
| | LOW-iVT | 1 | 1 | 1 | 1 | 0 | 0 |
| | 2ND | 1 | 1 | 1 | 1 | 1 | 0 |
| | HIGH-iVT | 1 | 1 | 1 | 0 | 1 | 0 |
| | HIGH | 1 | 1 | 1 | 0 | 1 | 1 |

EV-LOW MODE

EV-LOW-iVT MODE

EV-2ND MODE

EV-HIGH-iVT MODE

EV-HIGH MODE (HEV-)LOW MODE (HEV-)LOW-iVT MODE (HEV-)2ND MODE (HEV-)HIGH-iVT MODE (HEV-)HIGH MODE

SHIFT MOTION MODE

ACCELERATION MOTION MODE
CAUSING NO INTERFERENCE
WITH SHIFT MOTION MODE

ORDINARY ACCELERATION
MOTION MODE

SPEED RATIO CONTROL APPARATUS AND METHOD FOR A HYBRID TRANSMISSION

BACKGROUND OF THE INVENTION a) Field of the Invention

The present invention relates to speed ratio (or, gear ratio) control apparatus and method for a hybrid transmission, in which an engine, an output member, a first motor/generator, and a second motor/generator are coupled separately (or, independently) to different rotational elements in a two-degree-of-freedom differential mechanism having at least four rotational elements.

b) Description of the Related Art

A Japanese Patent Application First Publication No. 2003-34154 published on Feb. 4, 2003 exemplifies a previously proposed hybrid transmission speed ratio control apparatus in which the speed ratio is provided by means of two motor/generators. During a vehicle driving with an accelerator manipulated variable kept constant, the speed ratio is controlled by maintaining an engine speed at a target value. Moreover, when the accelerator is released by a driver, the vehicle is decelerated with the speed ratio controlled in accordance with a traveling state (i.e., a vehicle velocity or a target driving force).

SUMMARY OF THE INVENTION

However, in the previously proposed transmission speed ratio control apparatus control as described above, respective operating points (i.e., a rotational speed and a torque) of the engine and both of the two motor/generators are determined, with each of the speed ratio control (or, input rotational speed control) in accordance with a speed ratio (control) manipulated variable and a torque control separately taken into consideration. This torque control is performed by controlling an instantaneous driving force, while stabilizing the speed ratio with three torques of a first motor/generator torque, a second motor/generator torque and an engine torque, for example, by solving a equation-of-motion directly. In this torque control, both of the torque control for stabilization in the speed ratio and the torque control for the target instantaneous driving force are contained. Hence, in order to perform a speed ratio stabilization control and the instantaneous driving force control with the speed ratio control not being affected, a torque adjustment between these controls becomes difficult and an operation processing for these controls becomes complicated.

It is, therefore, an object of the present invention to provide speed ratio control apparatus and method for the hybrid transmission which are capable of giving a speed ratio control torque that easily stabilizes the speed ratio in the speed ratio control while causing no interference with the instantaneous driving force control.

According to one aspect of the present invention, there is provided a speed ratio control apparatus for a hybrid transmission, the hybrid transmission having a two-degree-of-freedom differential mechanism, the differential mechanism having at least four rotational elements to each of which an engine, a first motor/generator, a second motor/generator, and an output member are coupled separately, the speed ratio control apparatus comprising: a speed ratio manipulated variable calculating section that calculates a speed ratio manipulated variable on the basis of a deviation between a speed ratio representative command value and a speed ratio representative actually measured value; a speed ratio purpose component command value calculating section that calculates a speed ratio purpose component command value of a torque on each drivingly input element which is drivingly inputted to the differential mechanism according to the speed ratio manipulated variable calculated by the speed ratio manipulated variable calculating section, an acceleration ratio of each of the engine, the first motor/generator, and the second motor/generator in a shift motion, and an inertia of each of the engine, the first motor/generator, and the second motor/generator in the shift motion; and a speed ratio control command outputting section that outputs the calculated speed ratio purpose component command value to a torque actuator of each of the engine, the first motor/generator, and the second motor/generator.

According to another aspect of the invention, there is provided a speed ratio control method for a hybrid transmission, the hybrid transmission having a two-degree-of-freedom differential mechanism, the differential mechanism having at least four rotational elements to each of which an engine, a first motor/generator, a second motor/generator, and an output member are coupled separately, the speed ratio control apparatus comprising: calculating a speed ratio manipulated variable on the basis of a deviation between a speed ratio representative command value and a speed ratio representative actually measured value; calculating a speed ratio purpose component command value of a torque on each drivingly input element which is drivingly inputted to the differential mechanism according to the calculated speed ratio manipulated variable, an acceleration ratio of each of the engine, the first motor/generator, and the second motor/generator in a shift motion, and an inertia of each of the engine, the first motor/generator, and the second motor/generator in the shift motion; and outputting the calculated speed ratio purpose component command value to a torque actuator of each of the engine, the first motor/generator, and the second motor/generator.

The disclosure of the invention does not necessarily describe all necessary features so that the invention may also be a sub-combination of these described features.

BRIEF DESCRIPTION OF THE DRAWINGS

FIG. 2 is an on/off status view representing engagement status of three interlock elements of the hybrid transmission in each driving mode.

FIG. 3 is an on/off status view representing active status of an engine, an engine clutch, a motor/generator, a low brake, a high clutch, and a high low brake of the hybrid transmission in five driving modes of a electric vehicle mode and five driving modes of a hybrid vehicle mode.

DETAILED DESCRIPTION OF THE PREFERRED EMBODIMENTS

Reference will hereinafter be made to the drawings in order to facilitate a better understanding of the present invention.

At first, a configuration in a first preferred embodiment according to the present invention will be described below.

[The drive System (configuration) of a hybrid transmission]

Figure 1:
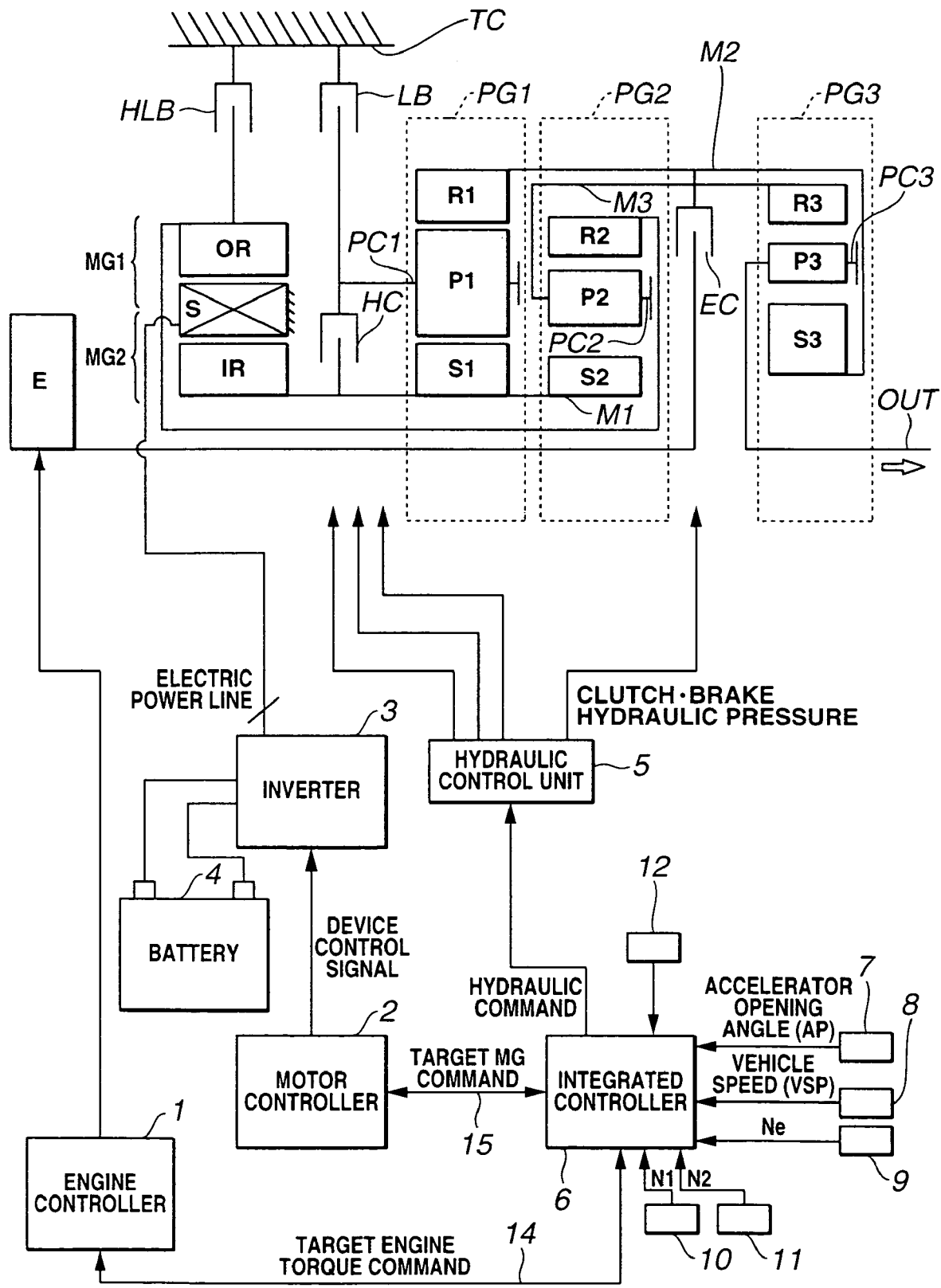
FIG. 1 is a schematic block diagram representing a configuration of a hybrid transmission to which a speed ratio control apparatus in a first preferred embodiment according to the present invention is applied.

FIG. 1 is a schematic block diagram representing a configuration of a hybrid transmission to which a speed ratio control apparatus of the first preferred embodiment according to the present invention is applied. The drive system of the hybrid transmission in the first embodiment has an engine E, a first motor/generator MG1, and a second motor/generator MG2 as power sources, as shown in FIG. 1. A differential mechanism to which these power sources E, MG1, and MG2 and an output shaft OUT (output member) are coupled has a first planetary gear PG1, a second planetary gear PG2, a third planetary gear PG3, an engine clutch EC, a low brake LB, a high clutch HC, and a high low brake HLB.

A multilayer motor which coaxially places a stator S, an inner rotor IR and an outer rotor OR is applied to first motor/generator MG1 and second motor/generator MG2. This multilayer motor independently controls inner rotor IR and outer rotor OR by impressing a combined current (for example, a combined current of 3 phase alternating current and 6 phase alternating current) to a stator coil of stator S. First motor/generator MG1 is constituted by stator S and outer rotor OR. Second motor/generator MG2 is constituted by stator S and inner rotor IR.

All of first planetary gear PG1, second planetary gear PG2, and third planetary gear PG3 that constitute the differential mechanism are single-pinion type planetary gears. First planetary gear PG1 is constituted by a first sun gear S1, a first pinion carrier PC1 supporting a first pinion P1, and a first ring gear R1 meshing with first pinion P1. Second planetary gear PG2 is constituted by a second sun gear S2, a second pinion carrier PC2 supporting a second pinion P2, and a second ring gear R2 meshing with second pinion P2. Third planetary gear PG3 is constituted by a third sun gear S3, a third pinion carrier PC3 supporting a third pinion P3, and a third ring gear R3 meshing with third pinion P3.

First sun gear S1 is directly connected to second sun gear S2 through a first rotational member M1, and first ring gear R1 is directly connected to third sun gear S3 through a second rotational member M2, and second pinion carrier PC2 is directly connected to third ring gear R3 through a third rotational member M3. Therefore, one set of three planetary gears, PG1, PG2 and PG3 has six rotational elements, first rotational member M1, second rotational member M2, third rotational member M3, first pinion carrier PC1, second ring gear R2, and third pinion carrier PC3.

Conditions of the coupling among power sources engine E, first motor/generator MG1 and second motor/generator MG2 as drivingly input elements which are drivingly inputted to the differential mechanism, output shaft OUT, engine clutch EC, each interlock element LB, HC, HLB, and six rotational elements of the differential mechanism will be explained below. In addition, second rotational member M2 is in free condition where M2 is coupled with neither of these elements. Five remaining rotational elements are coupled as follows.

An engine output shaft of engine E is coupled to third rotational member M3 through engine clutch EC. Therefore, both of second pinion carrier PC2 and third ring gear R3 become an engine speed (or, have same rotational speed as the engine) through third rotational member M3 when engine clutch EC is engaged.

An first motor/generator output shaft of first motor/generator MG1 is directly connected to second ring gear R2. High low brake HLB is interposed between the first motor/generator output shaft and a transmission case TC. Therefore, second ring gear R2 becomes MG1's rotational speed when high low brake HLB is disengaged. Furthermore, second ring gear R2 and first motor/generator MG1 are stopped when high low brake HLB is engaged.

An second motor/generator output shaft of second motor/generator MG2 is directly connected to first rotational member M1. High clutch HC is interposed between the second motor/generator output shaft and first pinion carrier PC1, and low brake LB is interposed between first pinion carrier PC1 and transmission case TC. Therefore, first pinion carrier PC1 is stopped when only low brake LB is engaged. First sun gear S1, second sun gear S2, and first pinion carrier PC1 become MG2's rotational speed when only high clutch HC is engaged. Furthermore, first sun gear S1, second sun gear S2, and first pinion carrier PC1 are stopped when both of low brake LB and high clutch HC are engaged.

Output shaft OUT is directly connected to third pinion carrier PC3. In addition, a driving force is transmitted from output shaft OUT to both sides of driving wheels through a propeller-shaft, a differential-unit or a drive-shaft outside the drawing.

Thereby, as shown in FIG. 4A through 4E and FIG. 5A through 5E, first motor/generator MG1 (R2), engine E (PC2, R3), output shaft OUT (PC3), and second motor/generator MG2 (S1, S2) can be arrayed by this order on an alignment chart. Hence, an rigid-body lever model which expresses a dynamic motion of an planetary gear train in simple can be used.

The "alignment chart" is a speed chart used for an easier and more intelligible method to solve the speed ratio by drawings, with which a method to solve the speed ratio by formulas is replaced, when considering the speed ratio in a differential gear. Each rotational speed of corresponding rotational element is taken along an ordinate axis, and each rotational element such as ring gear, carrier, sun gear, is taken along an abscissa axis. Each space between rotational elements is so arranged as to satisfy a lever ratio ($\alpha$, $\beta$, $\delta$) of the alignment chart on the basis of a gear ratio of the sun gear and the ring gear. Incidentally, (1) in FIG. 4A and FIG. 5A designates the alignment chart of first planetary gear PG1, (2) designates the alignment chart of second planetary gear PG2, and (3) designates the alignment chart of third planetary gear PG3.

Engine clutch EC is a multiple-disc friction clutch which is engaged by a hydraulic pressure. Engine clutch EC is aligned on a rotational speed axis of engine E on the alignment chart in FIG. 4A through 4E and FIG. 5A through 5E. Engine clutch EC inputs the rotational speed and the torque of engine E into third rotational member M3 which is an input rotational element for the engine in the differential mechanism when engine clutch EC is engaged.

Low brake LB is a multiple-disc friction clutch which is engaged by the hydraulic pressure. Low brake LB is aligned outside the rotational speed axis of second motor/generator MG2 on the alignment chart in FIG. 4A through 4E and FIG. 5A through 5E. Low brake LB fixes the speed ratio to low speed ratio while performing a low side speed ratio mode which is in charge of a lower side of the speed ratio when low brake LB is engaged, as shown in FIG. 4A, FIG. 4B, FIG. 5A and FIG. 5B.

High clutch HC is a multiple-disc friction clutch which is engaged by the hydraulic pressure. High clutch HC is aligned on a rotational speed axis of second motor/generator MG2 on the alignment chart in FIG. 4A through 4E and FIG. 5A through 5E. High clutch HC performs a high side speed ratio mode which is in charge of a higher side of the speed ratio when High clutch HC is engaged, as shown in FIG. 4D, FIG. 4E, FIG. 5D and FIG. 5E.

High low brake HLB is a multiple-disc friction clutch which is engaged by the hydraulic pressure. High low brake HLB is aligned on a rotational speed axis of first motor/generator MG1 on the alignment chart in FIG. 4A through 4E and FIG. 5A through 5E. High low brake HLB fixes the speed ratio to low speed ratio in under-driving side when high low brake HLB is engaged with low brake LB also being engaged. And high low brake HLB fixes the speed ratio to high speed ratio in over-driving side when high low brake HLB is engaged with high clutch HC also being engaged.

[The Control System (Configuration) of a Hybrid Transmission]

A control system of the hybrid transmission in the first preferred embodiment is constituted by an engine controller 1, a motor controller 2, an inverter 3, a battery 4, a hydraulic control unit 5, an integrated controller 6, an accelerator opening angle sensor 7, a vehicle speed sensor 8, an engine speed sensor 9, a first motor/generator rotational speed sensor 10, a second motor/generator rotational speed sensor 11, and a third ring gear rotational speed sensor 12, as shown in FIG. 1.

Engine controller 1 outputs a command which controls the operating point of the engine (i.e., an engine speed Ne and an engine torque Te) to for example, a throttle valve actuator (or, a torque actuator) outside of FIG. 1, according to a target engine torque command from integrated controller 6. The target engine torque command is outputted from integrated controller 6 which receives an accelerator opening angle AP derived from accelerator opening angle sensor 7 and engine speed Ne derived from engine speed sensor 9.

Motor controller 2 outputs a command which independently controls the operating point of first motor/generator MG1 (i.e., N1 and a first motor/generator torque T1) and the operating point of second motor/generator MG2 (i.e., N2 and a second motor/generator torque T2) to inverter 3 (i.e., a torque actuator), according to a target motor/generator (MG) torque command from integrated controller 6. The target MG torque command is outputted from integrated controller 6 which receives a first motor/generator rotational speed N1 derived from first motor/generator rotational speed sensor 10 using a resolver and a second motor/generator rotational speed N2 derived from second motor/generator rotational speed sensor 11 using the resolver. In addition, this motor controller 2 outputs an information on a battery S.O.C showing a charge status of battery 4 to integrated controller 6.

Inverter 3 is coupled to the stator coil of stator S shared in first motor/generator MG1 and second motor/generator MG2. Inverter 3 generates the combined current in accordance with the command from motor controller 2. This inverter 3 is coupled to battery 4 which discharges during under operation and is charged during under regeneration.

Hydraulic control unit 5 carries out an engagement hydraulic control and a disengagement hydraulic control of engine clutch EC, low brake LB, high clutch HC, and high low brake HLB according to a hydraulic command received from integrated controller 6. These engagement hydraulic control and disengagement hydraulic control include a slip friction clutch control such as a slip engagement hydraulic control and a slip disengagement hydraulic control.

Integrated controller 6 receives accelerator opening angle AP derived from accelerator opening angle sensor 7, a vehicle speed VSP derived from vehicle speed sensor 8, engine speed Ne derived from engine speed sensor 9, first motor/generator rotational speed N1 derived from first motor/generator rotational speed sensor 10, second motor/generator rotational speed N2 derived from second motor/generator rotational speed sensor 11, an engine input rotational speed $\omega_{in}$ derived from third ring gear rotational speed sensor 12, and so on. Then, integrated controller 6 carries out a predetermined processing and outputs control commands in accordance with a result of the processing to engine controller 1, motor controller 2, and hydraulic control unit 5.

Integrated controller 6 and engine controller 1 are coupled by a two-way communication line 14 for information interchange. Integrated controller 6 and motor controller 2 are also coupled by a two-way communication line 15 for information interchange.

[The Driving Mode]

The hybrid transmission in the first preferred embodiment is applicable not only to a FF (front-engine front-drive) vehicle but also a FR (front-engine rear-drive) vehicle since output shaft OUT of the hybrid transmission can be made to accord with the engine output shaft coaxially on the same axle. Moreover, in the hybrid transmission in the first preferred embodiment, a common speed ratio region is not covered by only one driving mode as an infinitely variable speed ratio mode, but the common speed ratio region is covered by two sharing mode of a low side infinitely variable speed ratio mode and a high side infinitely variable speed ratio mode as the infinitely variable speed ratio modes. Hence, an output assignment rate by two motor/generators MG1 and MG2 can be suppressed to be equal to or smaller than about 20% of an engine output which engine E generates.

The hybrid transmission has five driving modes of a fixed low speed ratio mode (hereinafter, also called "Low mode"), the low side infinitely variable speed ratio mode (hereinafter, also called "Low-iVT mode"), a fixed 2nd speed ratio mode (hereinafter, also called "2nd mode"), the high side infinitely variable speed ratio mode (hereinafter, also called "High-iVT mode"), and a fixed high speed ratio mode (hereinafter, also called "High mode"), as shown in FIG. 2.

The Low mode is performed by engaging low brake LB and high low brake HLB and disengaging high clutch HC as shown in FIG. 2. Low-iVT mode is performed by engaging low brake LB and disengaging high clutch HC and high low brake HLB. 2nd mode is performed by engaging low brake LB and high clutch HC and disengaging high low brake HLB. High-iVT mode is performed by engaging high clutch HC and disengaging low brake LB and high low brake HLB. High mode is performed by engaging high clutch HC and high low brake HLB and disengaging low brake LB.

Figure 4A:
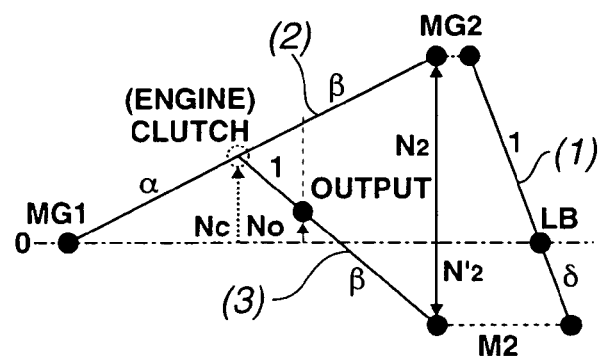
FIG. 4A through 4E are alignment charts representing five driving modes of the electric vehicle mode in the hybrid transmission.
Figure 4B:
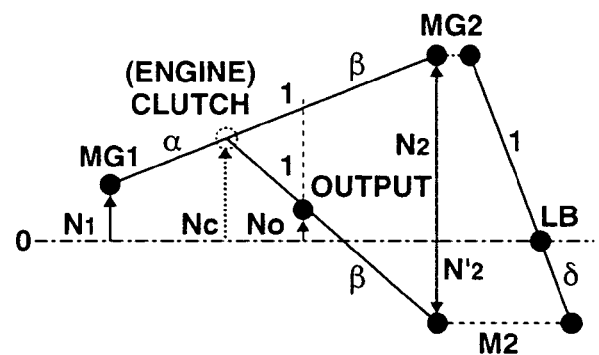
Figure 4C:
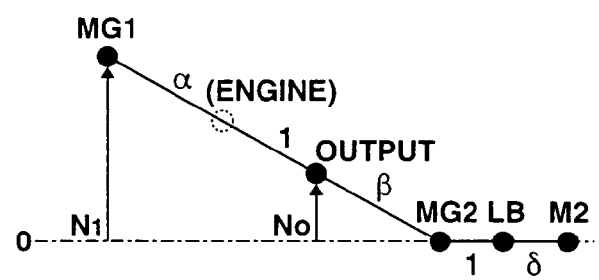
Figure 4D:
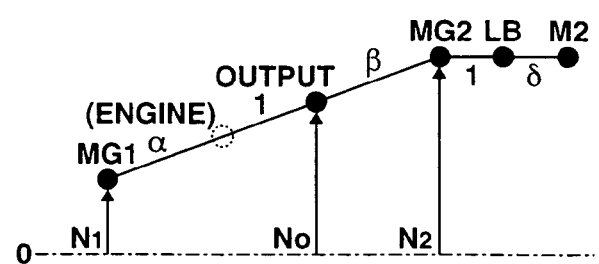
Figure 4E:
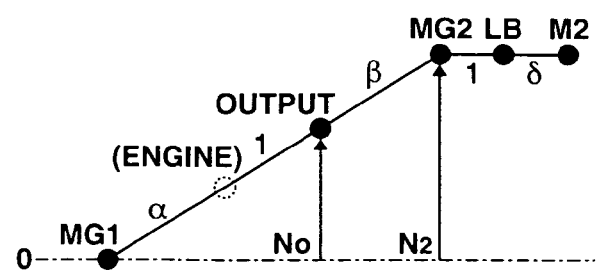
Figure 5A:
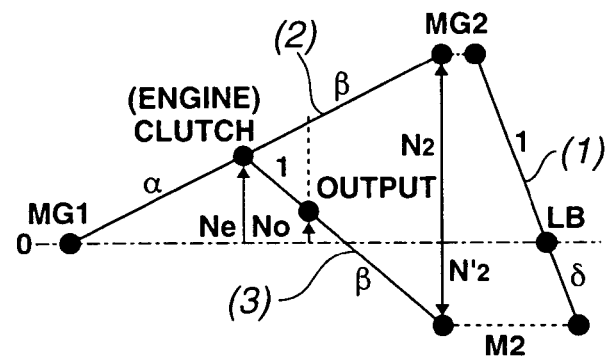
FIG. 5A through 5E are alignment charts representing five driving modes of the hybrid vehicle mode in the hybrid transmission.
Figure 5B:
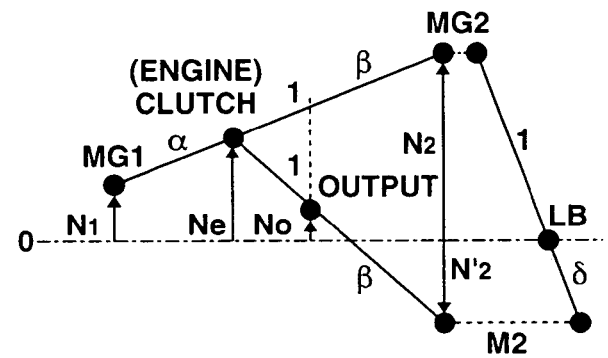
Figure 5C:
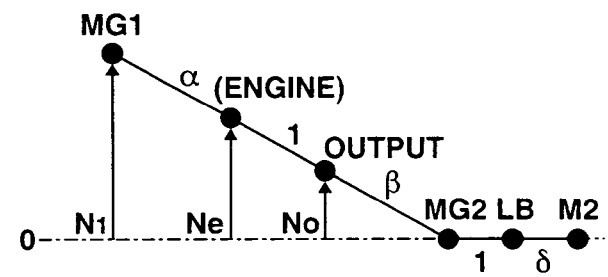
Figure 5D:
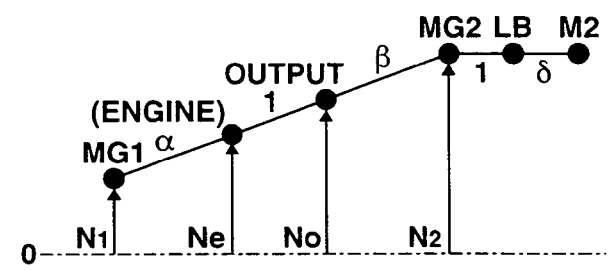
Figure 5E:
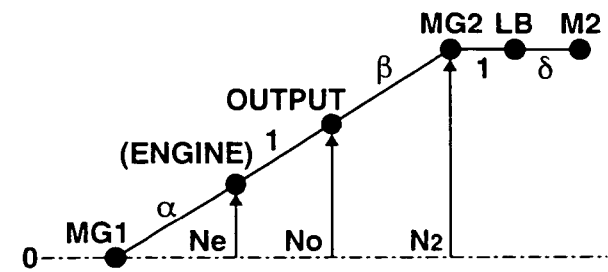

Each of these five driving modes is divided into an electric motor vehicle mode (hereinafter, also called "EV mode") which is driven by only both motor/generators MG1 and MG2 without using engine E, and a hybrid vehicle mode (hereinafter, also called "HEV mode") which is driven by engine E and both motor/generators MG1 and MG2. Therefore, "ten driving modes" in a total of EV mode and HEV mode will be realized as shown in FIG. 3. The alignment chart of EV-Low mode is shown in FIG. 4A, and the alignment chart of EV-Low-iVT mode is shown in FIG. 4B, and the alignment chart of EV-2nd mode is shown in FIG. 4C, and the alignment chart of EV-High-iVT mode (i.e., the electric motor vehicle infinitely variable speed ratio mode) is shown in FIG. 4D, and the alignment chart of EV-High mode is shown in FIG. 4E. The alignment chart of HEV-Low mode is shown in FIG. 5A, and the alignment chart of HEV-Low-iVT mode is shown in FIG. 5B, and the alignment chart of HEV-2nd mode is shown in FIG. 5C, and the alignment chart of HEV-High-iVT mode (i.e., the hybrid vehicle infinitely variable speed ratio mode) is shown in FIG. 5D, and the alignment chart of HEV-High mode is shown in FIG. 5E.

Integrated controller 6 has a driving mode map in which "ten driving modes" was assigned in a three-dimensional space formed by accelerator opening angle AP, vehicle speed VSP, and battery S.O.C. When the vehicle is traveling, or when the vehicle come to stop, integrated controller 6 searches the driving mode map in accordance with detected accelerator opening angle AP, detected vehicle speed VSP, and detected battery S.O.C. Then integrated controller 6 selects the optimal driving mode according to the charge status of the battery or a vehicle operating point which is decided by accelerator opening angle AP and vehicle speed VSP.

If a mode transition between EV mode and HEV mode that is caused by a selection on the driving mode map is carried out, an engine start up or an engine stop is required. Hence, in this case, an engagement/disengagement control of engine clutch EC is performed, or in addition to this control, an engagement/disengagement control of other interlock elements (e.g., clutch or brake) is also performed. Moreover, If the mode transition among five modes in EV mode or the mode transition among five modes in HEV mode is carried out, an engagement/disengagement control of interlock elements (e.g., clutch or brake) is performed. These mode transition controls are performed by a sequence control in accordance with a predetermined procedure so that the engine operating point or the motor operating point is transferred smoothly.

At next, an operation and an advantage in the first preferred embodiment according to the present invention will be described below.

[The Processing of the Speed Ratio Control]

Figure 6:
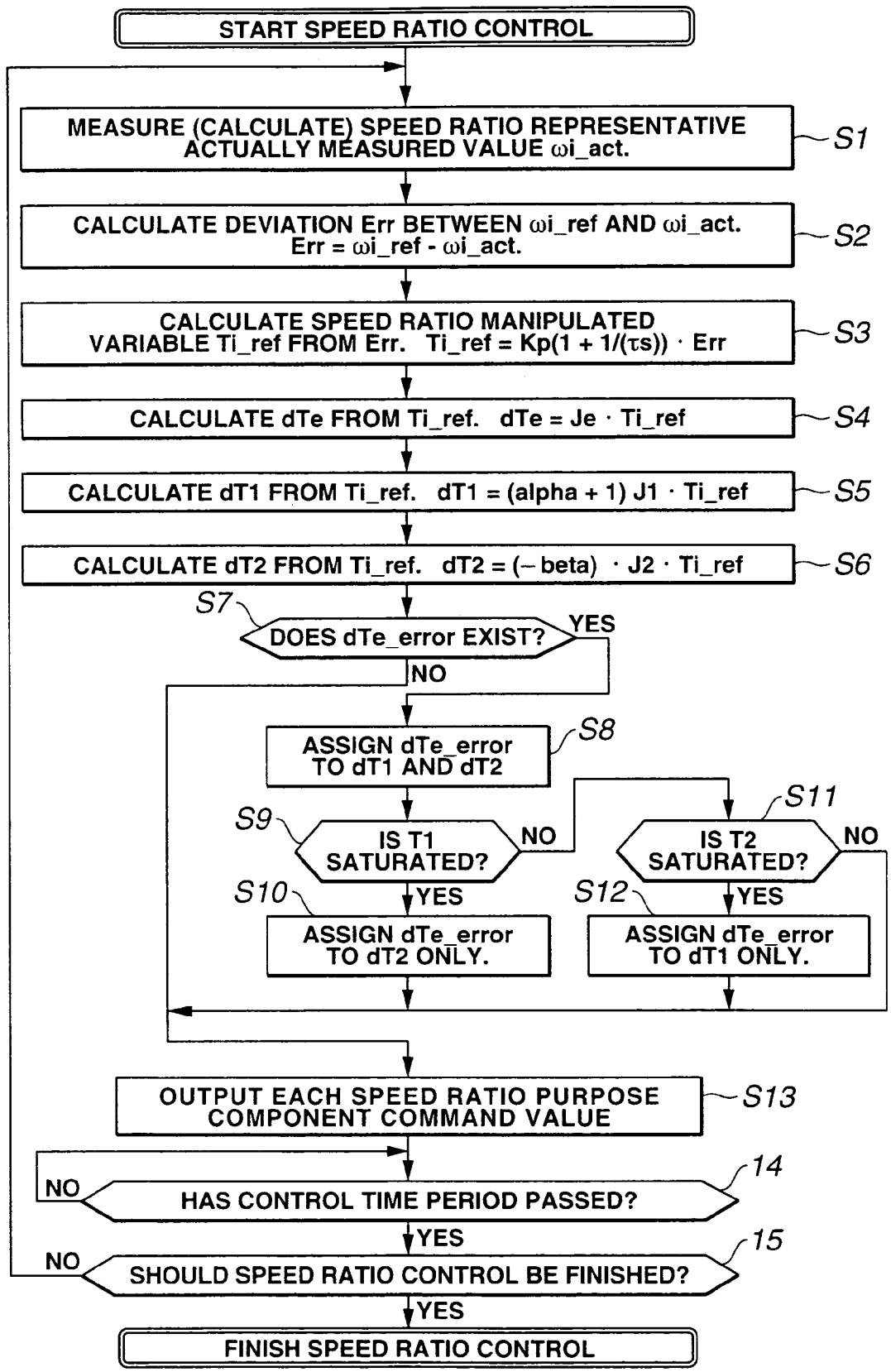
FIG. 6 is an operational flowchart representing the processing of the speed ratio control executed in an integrated controller of the first preferred embodiment of the speed ratio control apparatus according to the present invention.

FIG. 6 is an operational flowchart representing a processing of the speed ratio control executed in integrated controller 6 in the first preferred embodiment of speed ratio control apparatus and method according to the present invention. Each step is explained below. This flowchart starts when the HEV-High-iVT mode (ref., FIG. 5D) is selected during traveling, and this flow chart is ended when the other driving mode is selected.

At a step S1, integrated controller 6 calculates a speed ratio representative actually measured value $\omega_{i\_act}$ (for example, engine input rotational speed $\omega_{in}$ derived from third ring gear rotational speed sensor 12) and a routine goes to a step S2.

At step S2, integrated controller 6 calculates a speed ratio representative command value $\omega_{i\_ref}$ (for example, an engine input rotational speed command value) and calculates a deviation Err between speed ratio representative command value $\omega_{i\_ref}$ and speed ratio representative actually measured value $\omega_{i\_act}$. The routine goes to a step S3.

At step S3, integrated controller 6 calculates a speed ratio manipulated variable $T_{i\_ref}$ in accordance with, for example, a following equation (1) on the basis of deviation Err calculated at step S2, a proportionality coefficient $K_p$, and a time constant $\tau s$. Then, the routine goes to a step S4. The processing of step S3 corresponds to a speed ratio manipulated variable calculating section (means).

$$Ti\_ref = K_p(1+1/(\tau s))Err \quad (1).$$

At step S4, integrated controller 6 calculates a speed ratio purpose component command value of a torque on engine E (i.e., a speed ratio purpose component command value dTe for engine torque Te). Speed ratio purpose component command value dTe for engine torque Te is calculated in accordance with a following equation (2) on the basis of speed ratio manipulated variable $T_{i\_ref}$ calculated at step S3, an engine acceleration ratio 1 that is an acceleration ratio of engine E in a shift motion, and an engine inertia Je that is an inertia of engine E in the shift motion. The processing of step S4 corresponds to a speed ratio purpose component command value calculating section (means). The routine goes to a step S5.

$$dTe = 1 \cdot Je \cdot T_{i\_ref} = Je \cdot T_{i\_ref} \quad (2).$$

At step S5, integrated controller 6 calculates the speed ratio purpose component command value of the torque on first motor/generator MG1 (i.e., a speed ratio purpose component command value dT1 for first motor/generator torque T1). Speed ratio purpose component command value dT1 for first motor/generator torque T1 is calculated in accordance with a following equation (3) on the basis of speed ratio manipulated variable $T_{i\_ref}$ calculated at step S3, a first motor/generator acceleration ratio Ka ($=\alpha+1$) that is an acceleration ratio of first motor/generator MG1 in the shift motion, and a first motor/generator inertia J1 that is the inertia of first motor/generator MG1 in the shift motion. The processing of step S5 corresponds to the speed ratio purpose component command value calculating section (means). The routine goes to a step S6.

$$dT1 = (\alpha+1) \cdot J1 \cdot T_{i\_ref} \quad (3).$$

At step S6, integrated controller 6 calculates a speed ratio purpose component command value dT2 for second motor/generator torque T2 in accordance with a following equation (4) on the basis of speed ratio manipulated variable $T_{i\_ref}$ calculated at step S3, a second motor/generator acceleration ratio Kb ($=-\beta$) that is an acceleration ratio of second motor/generator MG2 in the shift motion, and a second motor/generator inertia J2 that is the inertia of second motor/generator MG2 in the shift motion. The processing of step S6 corresponds to the speed ratio purpose component command value calculating section (means). The routine goes to a step S7.

$$dT2 = (-\beta) \cdot J2 \cdot T_{i\_ref} \quad (4).$$

At step S7, integrated controller 6 determines whether a deviation torque $dTe_{\_error}$ exists or not between speed ratio purpose component command value dTe for engine torque Te and speed ratio purpose component actual value for engine torque Te. If YES, the routine goes to a step S8. If NO, the routine goes to a step S13. For example, integrated controller 6 may determine YES when calculated deviation torque $dTe_{\_error}$ is equal to or larger than a predetermined value.

At step S8, integrated controller 6 assigns deviation torque $dTe_{\_error}$ calculated at step S7 to speed ratio purpose component command value dT1 for first motor/generator torque T1 and speed ratio purpose component command value dT2 for second motor/generator torque T2. An assigned deviation torque $dt1_{\_comp}$ which is an assigned value for speed ratio purpose component command value dT1 and an assigned deviation torque $dT2_{\_comp}$ which is an assigned value for speed ratio purpose component command value dT2 are calculated, for example, in accordance with following equations (5) and (6). Then, these assigned deviation torques $dT1_{\_comp}$ and $dT2_{\_comp}$ are respectively added to speed ratio purpose component command value dT1 and speed ratio purpose component command value dT2.

$$dT1_{\_comp} = dTe_{\_error}/(1+\alpha+\beta) \quad (5).$$

$$dT2_{\_comp} = -dTe_{\_error}/(1+\alpha+\beta) \quad (6).$$

The processing of step S8 corresponds to a speed ratio purpose component command value correction section (means). The routine goes to a step S9.

At step S9, integrated controller 6 determines whether first motor/generator torque T1 is saturated or not in the case where assigned deviation torque $dt1_{\_comp}$ calculated by the equation (5) is added to speed ratio purpose component command value dT1 for first motor/generator torque T1. If YES, the routine goes to a step S10. If NO, the routine goes to a step S11.

At step S10, integrated controller 6 assigns deviation torque $dTe_{\_error}$ to only speed ratio purpose component command value dT2 for second motor/generator torque T2 if YES at step S9. Assigned deviation torque $dT2_{\_comp}$ are calculated, for example, in accordance with a following equation (7). Then, assigned deviation torque $dT2_{\_comp}$ is added to speed ratio purpose component command value dT2. The routine goes to a step S13.

$$dT2_{\_comp} = -dTe_{\_error}/(\beta) \quad (7).$$

At step S11, integrated controller 6 determines whether second motor/generator torque T2 is saturated or not in the case where assigned deviation torque $dT2_{\_comp}$ calculated by the equation (6) is added to speed ratio purpose component command value dT2 for second motor/generator torque T2. If YES, the routine goes to a step S12. If NO, the routine goes to a step S13.

At step S12, integrated controller 6 assigns deviation torque $dTe_{\_error}$ into only speed ratio purpose component command value dT1 for first motor/generator torque T1 if YES at step S11. Assigned deviation torque $dT1_{\_comp}$ are calculated, for example, in accordance with a following equation (8). Then, assigned deviation torque $dT1_{\_comp}$ is added to speed ratio purpose component command value dT1. The routine goes to a step S13.

$$dT1_{\_comp} = dTe_{\_error}/(1+\alpha) \quad (8).$$

The processing of step S9 through step S12 corresponds to a speed ratio purpose component command value correction section (means).

At step S13, integrated controller 6 outputs each speed ratio purpose component command value dTe, dT1, and dT2 (i.e., each target torque command for engine E, first motor/generator MG1, and second motor/generator MG2) which is calculated by above-described processing to the torque actuator. Then, engine E, the output member, first motor/generator MG1, and second motor/generator MG2 output the torque according to speed ratio purpose component command values dTe, dT1, and dT2. The processing of step S13 corresponds to a speed ratio control command section (means). The routine goes to a step S14.

At step S14, integrated controller 6 determines whether a control (routine time) period has passed. This determination is continued until the control (routine time) period passes. Then, the routine goes to a step S15.

At step S15, integrated controller 6 determines whether the speed ratio control in HEV-High-iVT mode should be finished. If YES, integrated controller 6 finishes the speed ratio control. If NO, the routine goes back to the step S1.

In addition, when the EV-High-iVT mode (ref., FIG. 4D) is selected during traveling, the speed ratio control can be performed by using the above-described flowchart except the steps related to engine torque Te (i.e., except step S4 and step S7 through S12).

[The Relation Between a Shift Motion Mode Control and the Speed Ratio Control]

Figure 7A:
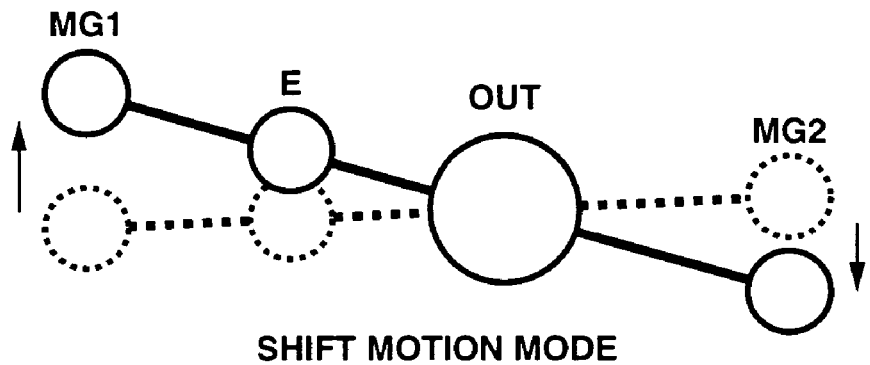
FIG. 7A through 7C are explanatory views for explaining respective lever motions of alignment charts in a shift motion mode, an acceleration motion mode causing no interference with the shift motion mode, and an ordinary acceleration motion mode.

At first, the shift motion mode is the mode in which the lever on the alignment chart rotates focusing on output shaft OUT that has the largest inertia, in such a manner that a rotational direction of the lever, for example, by first motor/generator torque T1, engine torque Te and second motor/generator torque T2 is balanced as shown in FIG. 7A.

Figure 7B:
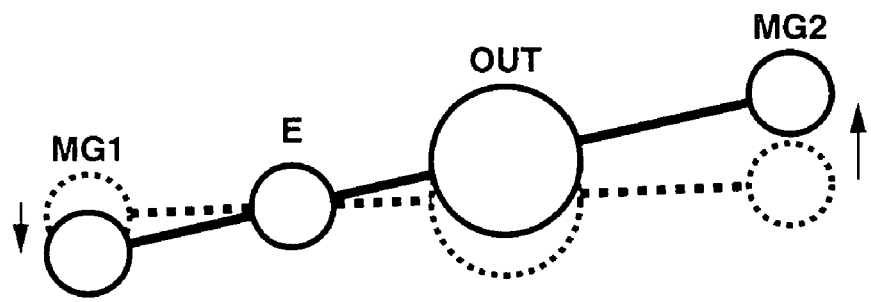
Figure 7C:
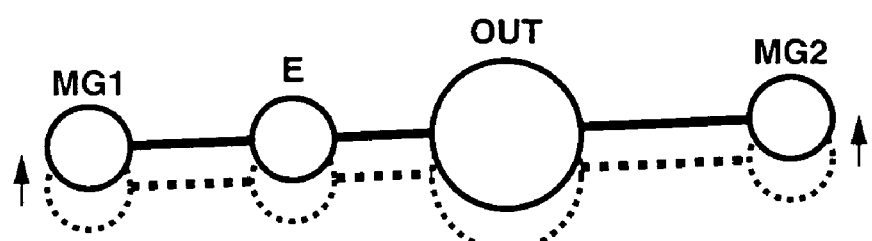

On the other hand, an acceleration motion mode has two modes. One is a mode in which the lever on the alignment chart rotates focusing on engine E in such a manner that, for example, the instantaneous driving force for output shaft OUT is assigned into first motor/generator torque T1 and second motor/generator torque T2 so that the rotational speed of output shaft OUT is increased, as shown in FIG. 7B. The other is a mode in which the lever on the alignment chart moves upward in parallel in such a manner that, for example, the instantaneous driving force for output shaft OUT is assigned into first motor/generator torque T1, engine torque Te and second motor/generator torque T2 so that the rotational speed of output shaft OUT is increased, as shown in FIG. 7C.

When FIG. 7A is compared with FIG. 7B, these two modes are same in a point that the lever on the alignment chart rotates although a rotational core of the lever on the alignment chart differs each other. Hence, each of the shift motion mode and the acceleration motion mode in which the lever on the alignment chart rotates has a noninterfering relation (or, causes no interference) mutually. By paying attention to this relation, in the present invention, the instantaneous driving force control and the speed ratio stabilization control among torque controls are separated, and the torque control for the speed ratio stabilization is included in the speed ratio control.

Figure 8A:
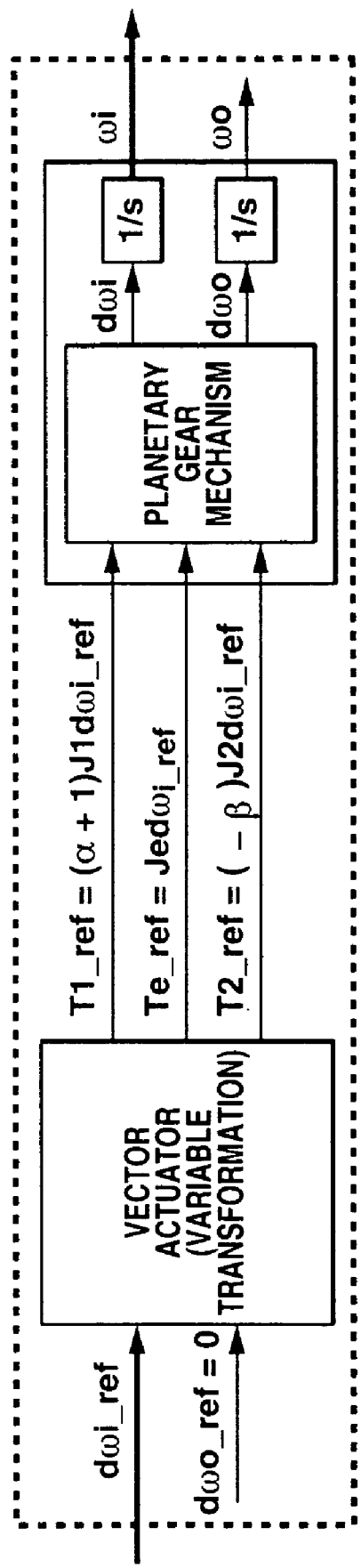
FIGS. 8A and 8B are explanatory control block diagrams in the case where the speed ratio control is executed during a constant-velocity traveling in the first preferred embodiment of the speed ratio control apparatus according to the present invention.
Figure 8B:
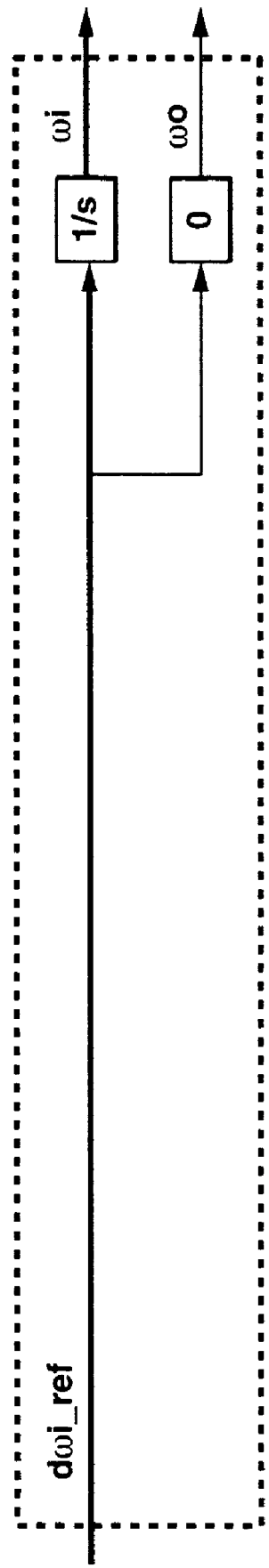
Figure 9A:
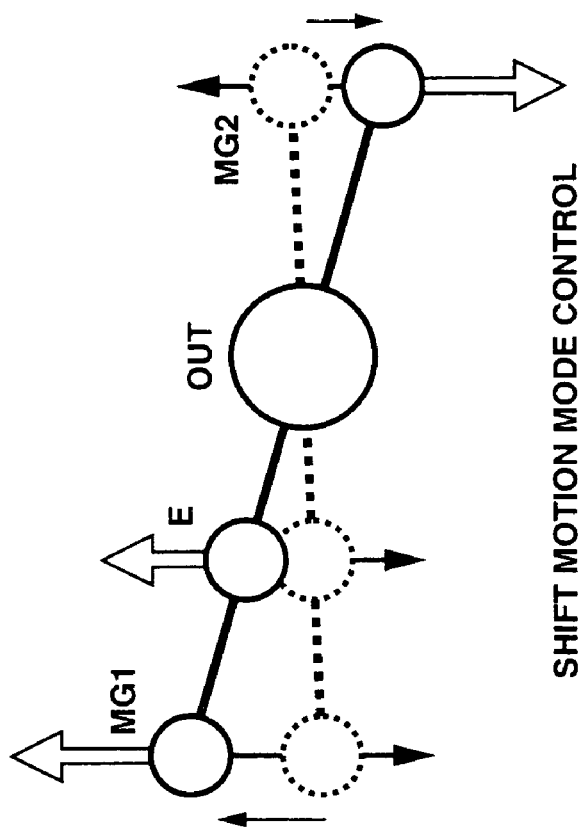
FIGS. 9A and 9B are views representing that the shift motion control is synonymous with the speed ratio control.
Figure 9B:
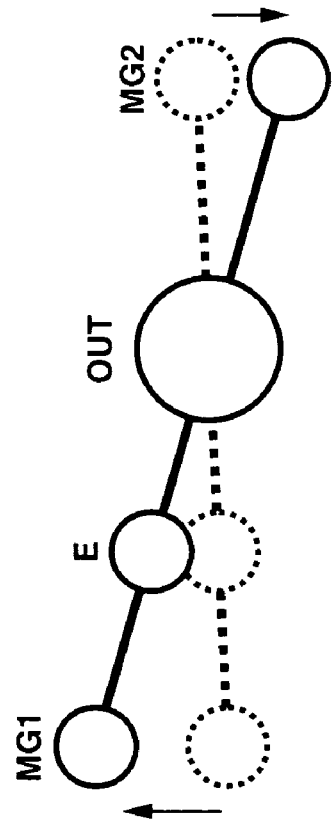

Supposed a constant speed traveling which makes an output rotational acceleration command value $d\omega_{o\_ref}$ zero in a hybrid control system, only an input rotational acceleration command value $d\omega_{i\_ref}$ which corresponds to the speed ratio manipulated variable per unit time is given to a vector actuator (or, a variable transformation) as shown in FIG. 8A. In this situation, the vector actuator transforms $d\omega_{i\_ref}$ to torque command values $T1_{\_ref}$, $Te_{\_ref}$, and $T2_{\_ref}$ in accordance with the acceleration ratios and the inertias in shift motion in same way as the first preferred embodiment according to the present invention and outputs $T1_{\_ref}$, $Te_{\_ref}$, and $T2_{\_ref}$ to the planetary gear mechanism (or, the differential mechanism). In this situation, an output rotational acceleration actually measured value $d\omega_o$ becomes zero and only an input rotational speed $\omega_i$ which is a integral value of an input rotational acceleration actually measured value $d\omega_i$ is outputted from the control system. Therefore, the speed ratio control which controls input rotational speed $\omega_i$ by the speed ratio stabilization torque control causes no interference with the instantaneous driving force control which varies an output rotational speed $\omega_o$ as shown in FIG. 8B. Hence, performing the shift motion mode control by means of the speed ratio stabilization torque control becomes synonymous with performing the speed ratio control as shown in FIGS. 9A and 9B.

[The Advantage of the Speed Ratio Control]

Figure 10:
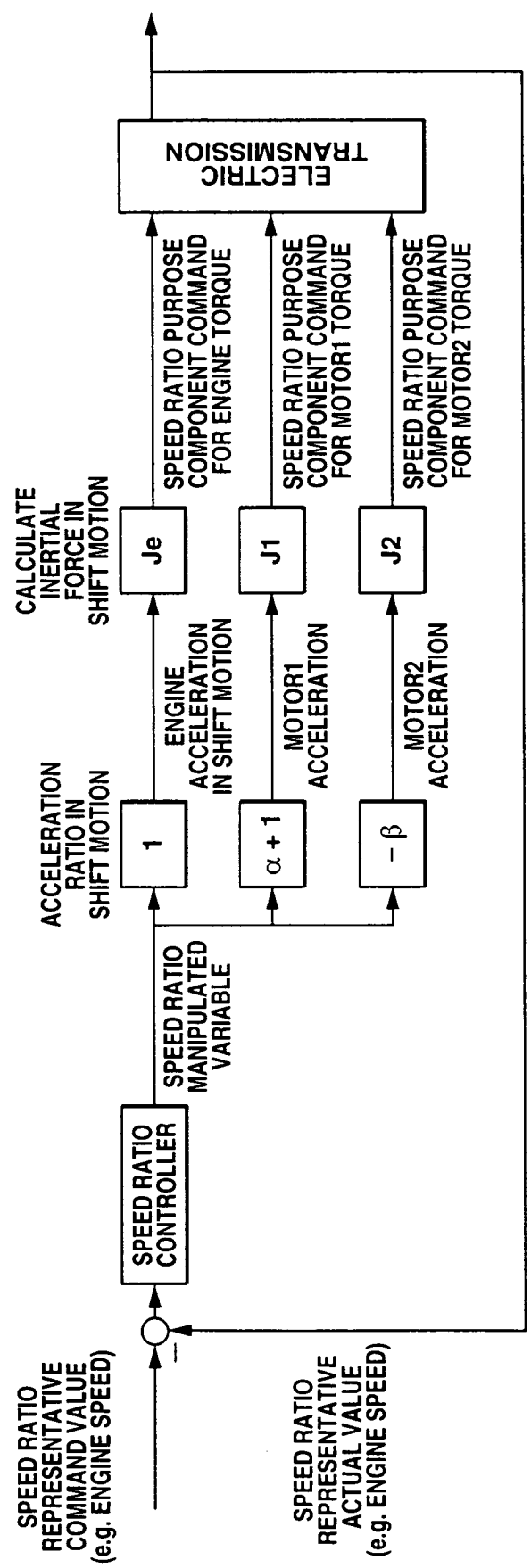
FIG. 10 is an explanatory control block diagram in the first preferred embodiment of the speed ratio control apparatus according to the present invention.

In the first preferred embodiment according to the present invention, as shown in FIG. 10, a speed ratio controller receives a deviation between the speed ratio representative command value (for example, an engine speed command value) and the speed ratio representative actual value (for example, an engine speed actual value) to which an output via an electric transmission (=the hybrid transmission) is fed back. Then, the speed ratio controller calculates the speed ratio manipulated variable. Moreover, the speed ratio controller calculates the engine acceleration in the shift motion, the motor1 acceleration in the shift motion, and the motor2 acceleration in the shift motion by multiplying the calculated speed ratio manipulated variable by the acceleration ratios (1, α+1, and −β) in the shift motion for respective driving input elements. Moreover, the speed ratio controller calculates the speed ratio purpose component command for the engine toque, the speed ratio purpose component command for the motor1 toque, and the speed ratio purpose component command for the motor2 toque by multiplying the calculated accelerations in the shift motion by the inertias (Je, J1, and J2) in the shift motion for respective driving input elements. Then, the electric transmission receives these calculated speed ratio purpose component commands.

Namely, in a case where the HEV-High-iVT mode is selected during traveling and deviation torque $dTe_{\_error}$ does not exist between speed ratio purpose component command value dTe for engine torque Te and speed ratio purpose component actual value for engine torque Te, the routine goes as step S1→step S2→step S3→step S4→step S5→step S6→step S7→step S13 in the flowchart of FIG. 6. In this case, at step S4, S5 and S6, speed ratio purpose component command value dTe for engine torque Te, speed ratio purpose component command value dT1 for first motor/generator torque T1, and speed ratio purpose component command value dT2 for second motor/generator torque T2 are calculated on the basis of speed ratio manipulated variable $T_{i\_ref}$ calculated at step S3, the acceleration ratios (1, α+1, and −β) in a shift motion, and an inertias (Je, J1, and J2) in the shift motion. Then, Each speed ratio purpose component command value dTe, dT1, and dT2 is outputted to the torque actuator at step S13.

Figure 11:
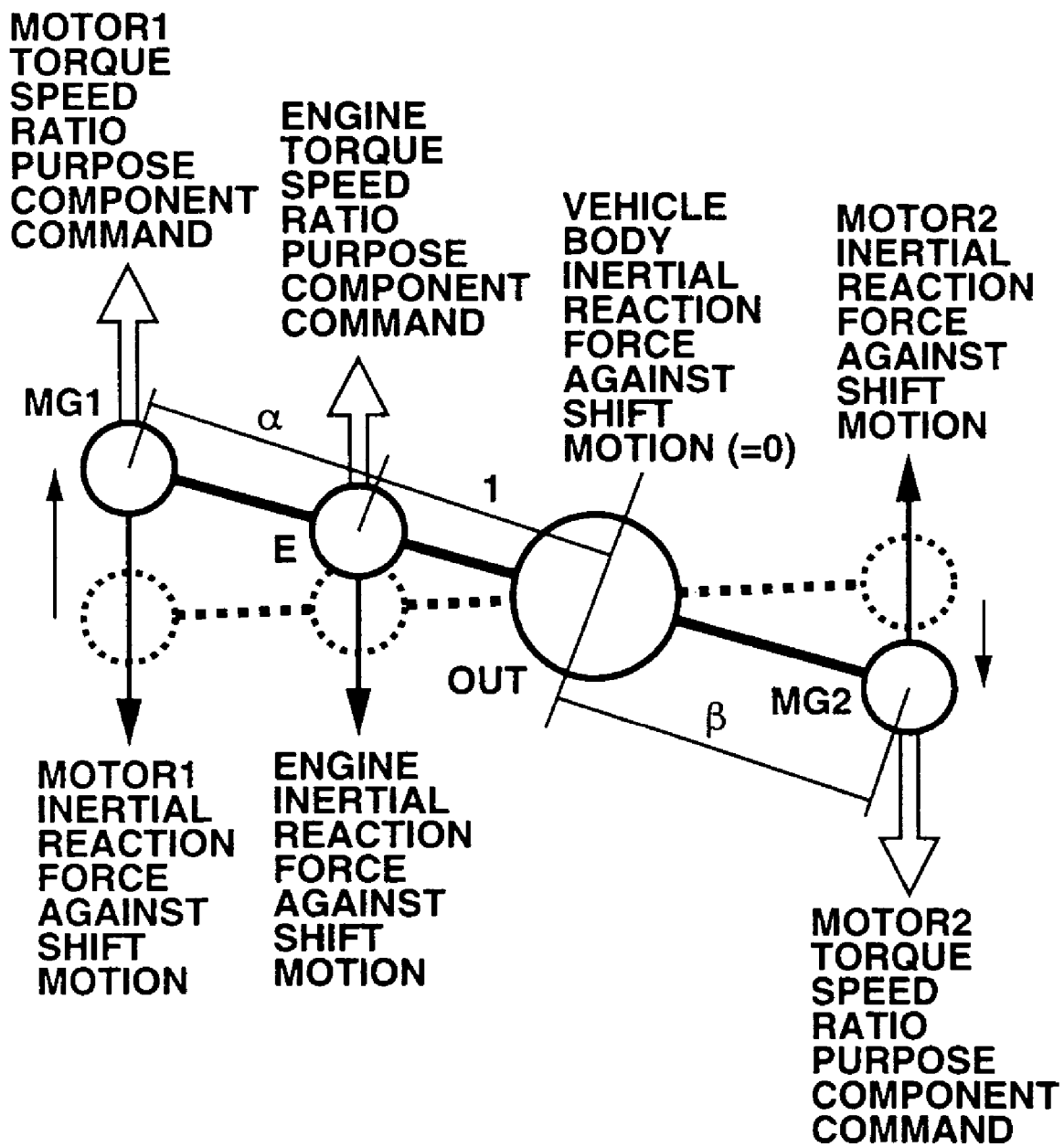
FIG. 11 is an explanatory view explaining a speed ratio stabilization when the speed ratio control is executed in the first preferred embodiment of the speed ratio control apparatus according to the present invention.

Therefore, as shown in FIG. 11, the lever on the alignment chart carries out the shift motion in which the lever rotates focusing on output shaft OUT from a dot line position to a solid line position in accordance with speed ratio manipulated variable $T_{i\_ref}$. Moreover, at the lever's position after a shift, speed ratio purpose component command value dT1 balances with a first motor/generator inertial reaction force against the shift motion, and speed ratio purpose component command value dTe balances with an engine inertial reaction force against the shift motion, and speed ratio purpose component command value dT2 balances with a second motor/generator inertial reaction force against the shift motion. As a result, a vehicle body inertial reaction force against the shift motion regarding output shaft OUT position becomes zero. Hence, at the lever's position after the shift, a torque balance in rotational direction is kept stabilized. Therefore, a stabilization feedback control of the speed ratio can be achieved. Therefore, the speed ratio control torque which easily stabilizes the speed ratio in the speed ratio control while causing no interference with the instantaneous driving force control is given to the torque actuator. In addition, since engine torque Te is also a manipulated variable for the speed ratio stabilization, a limit performance of a large-amplitude motion (i.e., a shift speed upper/lower limit) is better than a case where engine torque Te is not used as a manipulated variable for the speed ratio stabilization.

In addition, when the instantaneous driving force of output shaft OUT is requested to be varied due to an acceleration request (i.e., a higher velocity request) or a deceleration request (i.e., a slower velocity request), the control in which the instantaneous driving force of output shaft OUT is assigned to first motor/generator torque T1 and second motor/generator torque T2 is carried out independently of the above-described stabilization feedback control of the speed ratio. For example the lever rotates focusing on engine E, as shown in FIG. 7B. Hence, the increase/decrease requirement of the instantaneous driving force is realized.

Next, in a case where the HEV-High-iVT mode is selected during traveling and deviation torque $dTe_{\_error}$ exists between speed ratio purpose component command value dTe for engine torque Te and speed ratio purpose component actual value for engine torque Te, the routine goes as step S1→step S2→step S3→step S4→step S5→step S6→step S7→step S8→step S9→step S11→step S13 in the flowchart of FIG. 6. Namely this is, for example, the case where the instantaneous engine torque becomes saturated or a response to the instantaneous engine torque command value becomes delayed. In this case, at step S4, S5 and S6, speed ratio purpose component command value dTe for engine torque Te, speed ratio purpose component command value dT1 for first motor/generator torque T1, and speed ratio purpose component command value dT2 for second motor/generator torque T2 are calculated on the basis of speed ratio manipulated variable $T_{i\_ref}$ calculated at step S3, the acceleration ratios (1, α+1, and −β) in a shift motion, and an inertias (Je, J1, and J2) in the shift motion. Then, deviation torque $dTe_{\_error}$ is assigned and added to speed ratio purpose component command value dT1 and speed ratio purpose component command value dT2 at step S8. Then, assigned (and added) each speed ratio purpose component command value dTe, dT1 and dT2 is outputted to the torque actuator at step S13.

Therefore, the speed ratio control can be continued without affecting the speed ratio or the driving force controlled by the speed ratio stabilization torque control, even when, for example, the instantaneous engine torque becomes saturated or the response to the instantaneous engine torque command value becomes delayed.

Next, in a case where the HEV-High-iVT mode is selected during traveling and deviation torque dTe_error exists and first motor/generator torque T1 becomes saturated when this $dTe_{\_error}$ is assigned into speed ratio purpose component command values dT1 and dT2, the routine goes as step S1→step S2→step S3→step S4→step S5→step S6→step S7→step S8→step S9→step S10→step S13 in the flowchart of FIG. 6. In this case, deviation torque $dTe_{\_error}$ is assigned only into speed ratio purpose component command values dT2 for second motor/generator torque T2 at step S10. Moreover, in a case where the HEV-High-iVT mode is selected during traveling and deviation torque dTe$_{\_error}$ exists and second motor/generator torque T2 becomes saturated when this dTe$_{\_error}$ is assigned into speed ratio purpose component command values dT1 and dT2, the routine goes as step S1→step S2→step S3→step S4→step S5→step S6→step S7→step S8→step S9→step S11 step S12→step S13 in the flowchart of FIG. 6. In this case, deviation torque dTe$_{\_error}$ is assigned only into speed ratio purpose component command values dT1 for first motor/generator torque T1 at step S12.

Even when first motor/generator torque T1 becomes saturated or second motor/generator torque T2 becomes saturated, the speed ratio control can be continued without affecting the speed ratio controlled by the speed ratio stabilization torque control although the driving force is fluctuated a little.

This application is based on a prior Japanese Patent Application No. 2003-388364 filed on Nov. 18, 2003. The entire contents of this Japanese Patent Application No. 2003-388364 is hereby incorporated by reference.

Although the invention has been described above by reference to certain embodiments of the invention, the invention is not limited to the embodiments described above. Modifications and variations of the embodiments described above will occur to those skilled in the art in light of the above teachings. For example, the control in HEV-High-iVT mode and EV-High-iVT mode has been described above in the first preferred embodiment. However, the present invention is also applicable to HEV-Low-iVT mode and EV-Low-iVT mode. In this case (i.e., in HEV-Low-iVT mode or EV-Low-iVT mode), first motor/generator acceleration ratio in the shift motion (Ka) and second motor/generator acceleration ratio in the shift motion (−Kb) are merely modified to different values from the values in the first preferred embodiment.

In the first preferred embodiment, the speed ratio control apparatus in the present invention is applied to the hybrid transmission which is constituted by the differential mechanism having three single-pinion type planetary gears. However, the speed ratio control apparatus in the present invention is also applicable to the hybrid transmission which is constituted by the differential mechanism having, for example, Ravigneaux (Ravigneawx) planetary gear train as long as an engine, an output member, a first motor/generator, and a second motor/generator are coupled to respectively different rotational elements in the two-degree-of-freedom differential mechanism having at least four rotational elements. The scope of the invention is defined with reference to the following claims.

What is claimed is:

1. A speed ratio control apparatus for a hybrid transmission, the hybrid transmission having a two-degree-of-freedom differential mechanism, the differential mechanism having at least four rotational elements to each of which an engine, a first motor/generator, a second motor/generator, and an output member are coupled separately, the speed ratio control apparatus comprising:

a speed ratio manipulated variable calculating section that calculates a speed ratio manipulated variable on the basis of a deviation between a speed ratio representative command value and a speed ratio representative actually measured value;

a speed ratio purpose component command value calculating section that calculates a speed ratio purpose component command value of a torque on each drivingly input element which is drivingly inputted to the differential mechanism according to the speed ratio manipulated variable calculated by the speed ratio manipulated variable calculating section, an acceleration ratio of each of the engine, the first motor/generator, and the second motor/generator in a shift motion, and an inertia of each of the engine, the first motor/generator, and the second motor/generator in the shift motion; and a speed ratio control command outputting section that outputs the calculated speed ratio purpose component command value to a torque actuator of each of the engine, the first motor/generator, and the second motor/generator.

2. A speed ratio control apparatus for a hybrid transmission as claimed in claim 1, further comprising:

an engine clutch that is interposed between the engine and the differential mechanism, and operatively falls in an electric vehicle mode and a hybrid vehicle mode in the hybrid transmission according to an engagement-disengagement control of the engine clutch.

3. A speed ratio control apparatus for a hybrid transmission as claimed in claim 1, wherein the speed ratio purpose component command value calculating section calculates the speed ratio purpose component command values for a first motor/generator torque and a second motor/generator torque except an engine torque in such a manner that the following relationship is established:

$$dT1:dT2=(Ka)J1:(-Kb)J2,$$

wherein dT1 denotes the speed ratio purpose component command value for the first motor/generator torque, dT2 denotes the speed ratio purpose component command value for the second motor/generator torque, Ka denotes the acceleration ratio of the first motor/generator in the shift motion, J1 denotes the inertia of the first motor/generator in the shift motion, −Kb denotes the acceleration ratio of the second motor/generator in the shift motion, and J2 denotes the inertia of the second motor/generator in the shift motion.

4. A speed ratio control apparatus for a hybrid transmission as claimed in claim 3, further comprising:

an engine clutch that is interposed between the engine and the differential mechanism, and operatively falls in an electric vehicle mode and a hybrid vehicle mode in the hybrid transmission according to an engagement-disengagement control of the engine clutch, and wherein the electric vehicle mode is selected with the engine clutch disengaged.

5. A speed ratio control apparatus for a hybrid transmission as claimed in claim 4, further comprising:

interlock elements that are interposed among the first motor/generator, the second motor/generator, the differential mechanism, and a transmission case and operatively fall in a Low mode, a Low-iVT mode, a 2nd mode, a High-iVT mode, and a High mode in the hybrid transmission according to the engagement-disengagement control of the interlock elements, and wherein one of the Low-iVT mode and the High-iVT mode is selected by the engagement-disengagement control of the interlock elements.

6. A speed ratio control apparatus for a hybrid transmission as claimed in claim 1, wherein the speed ratio purpose component command value calculating section calculates the speed ratio purpose component command values for a first motor/generator torque, an engine torque, and a second motor/generator torque in such a manner that the following relationship is established:

$$dT1:dTe:dT2=(Ka)J1:(1)Je:(-Kb)J2,$$

wherein dT1 denotes the speed ratio purpose component command value for the first motor/generator torque, dTe denotes the speed ratio purpose component command value for the engine torque, dT2 denotes the speed ratio purpose component command value for the second motor/generator torque, (Ka) denotes the acceleration ratio of the first motor/generator in the shift motion, J1 denotes the inertia of the first motor/generator in the shift motion, (1) denotes the acceleration ratio of the engine in the shift motion, Je denotes the inertia of the engine in the shift motion, (−Kb) denotes the acceleration ratio of the second motor/generator in the shift motion, and J2 denotes the inertia of the second motor/generator in the shift motion.

7. A speed ratio control apparatus for a hybrid transmission as claimed in claim 6, further comprising:
an engine clutch that is interposed between the engine and the differential mechanism, and operatively falls in an electric vehicle mode and a hybrid vehicle mode in the hybrid transmission according to an engagement-disengagement control of the engine clutch, and wherein the hybrid vehicle mode is selected with the engine clutch engaged.

8. A speed ratio control apparatus for a hybrid transmission as claimed in claim 7, further comprising:
interlock elements that are interposed among the first motor/generator, the second motor/generator, the differential mechanism, and a transmission case and operatively fall in a Low mode, a Low-iVT mode, a 2nd mode, a High-iVT mode, and a High mode in the hybrid transmission according to the engagement-disengagement control of the interlock elements, wherein one of the Low-iVT mode and the High-iVT mode is selected by the engagement-disengagement control of the interlock elements.

9. A speed ratio control apparatus for a hybrid transmission as claimed in claim 1, further comprising:
a speed ratio purpose component command value correction section that assigns a deviation between the speed ratio purpose component command value for an engine torque and a speed ratio purpose component actual value for the engine torque to the speed ratio purpose component command value for a first motor/generator torque and the speed ratio purpose component command value for a second motor/generator torque.

10. A speed ratio control apparatus for a hybrid transmission as claimed in claim 9, wherein the speed ratio purpose component command value correction section that assigns the deviation only to the speed ratio purpose component command value for the non-saturated motor/generator torque in a case where at least one of the first motor/generator torque and the second motor/generator torque becomes saturated when the deviation is assigned to the speed ratio purpose component command values for the first motor/generator torque and the second motor/generator torque.

11. A speed ratio control apparatus for a hybrid transmission as claimed in claim 1, wherein the speed ratio purpose component command value calculating section assigns an instantaneous driving force for the output member to first motor/generator torque and second motor/generator torque when the instantaneous driving force for the output member is requested to be varied due to an acceleration/deceleration request.

12. A speed ratio control method for a hybrid transmission, the hybrid transmission having a two-degree-of-freedom differential mechanism, the differential mechanism having at least four rotational elements to each of which an engine, a first motor/generator, a second motor/generator, and an output member are coupled separately, the speed ratio control apparatus comprising:
calculating a speed ratio manipulated variable on the basis of a deviation between a speed ratio representative command value and a speed ratio representative actually measured value;
calculating a speed ratio purpose component command value of a torque on each drivingly input element which is drivingly inputted to the differential mechanism according to the calculated speed ratio manipulated variable, an acceleration ratio of each of the engine, the first motor/generator, and the second motor/generator in a shift motion, and an inertia of each of the engine, the first motor/generator, and the second motor/generator in the shift motion; and
outputting the calculated speed ratio purpose component command value to a torque actuator of each of the engine, the first motor/generator, and the second motor/generator.

13. A speed ratio control apparatus for a hybrid transmission, the hybrid transmission having a two-degree-of-freedom differential mechanism, the differential mechanism having at least four rotational elements to each of which an engine, a first motor/generator, a second motor/generator, and an output member are coupled separately, the speed ratio control apparatus comprising:
a speed ratio manipulated variable calculating means for calculating a speed ratio manipulated variable on the basis of a deviation between a speed ratio representative command value and a speed ratio representative actually measured value;
a speed ratio purpose component command value calculating means for calculating a speed ratio purpose component command value of a torque on each drivingly input element which is drivingly inputted to the differential mechanism according to the speed ratio manipulated variable calculated by the speed ratio manipulated variable calculating means, an acceleration ratio of each of the engine, the first motor/generator, and the second motor/generator in a shift motion, and an inertia of each of the engine, the first motor/generator, and the second motor/generator in the shift motion; and
a speed ratio control command outputting means for outputting the calculated speed ratio purpose component command value to a torque actuator of each of the engine, the first motor/generator, and the second motor/generator.

* * * * *